UNITED STATES PATENT OFFICE.

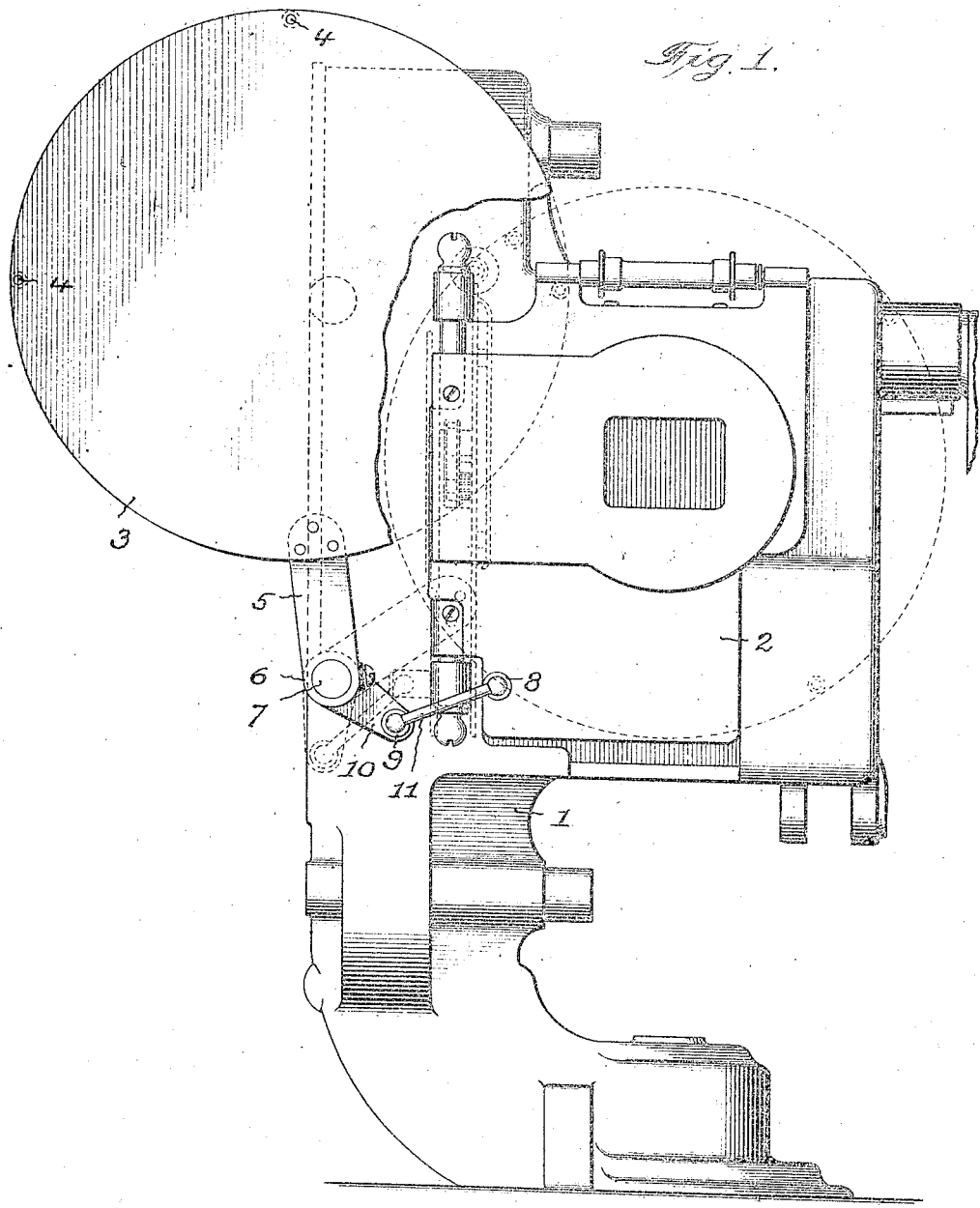

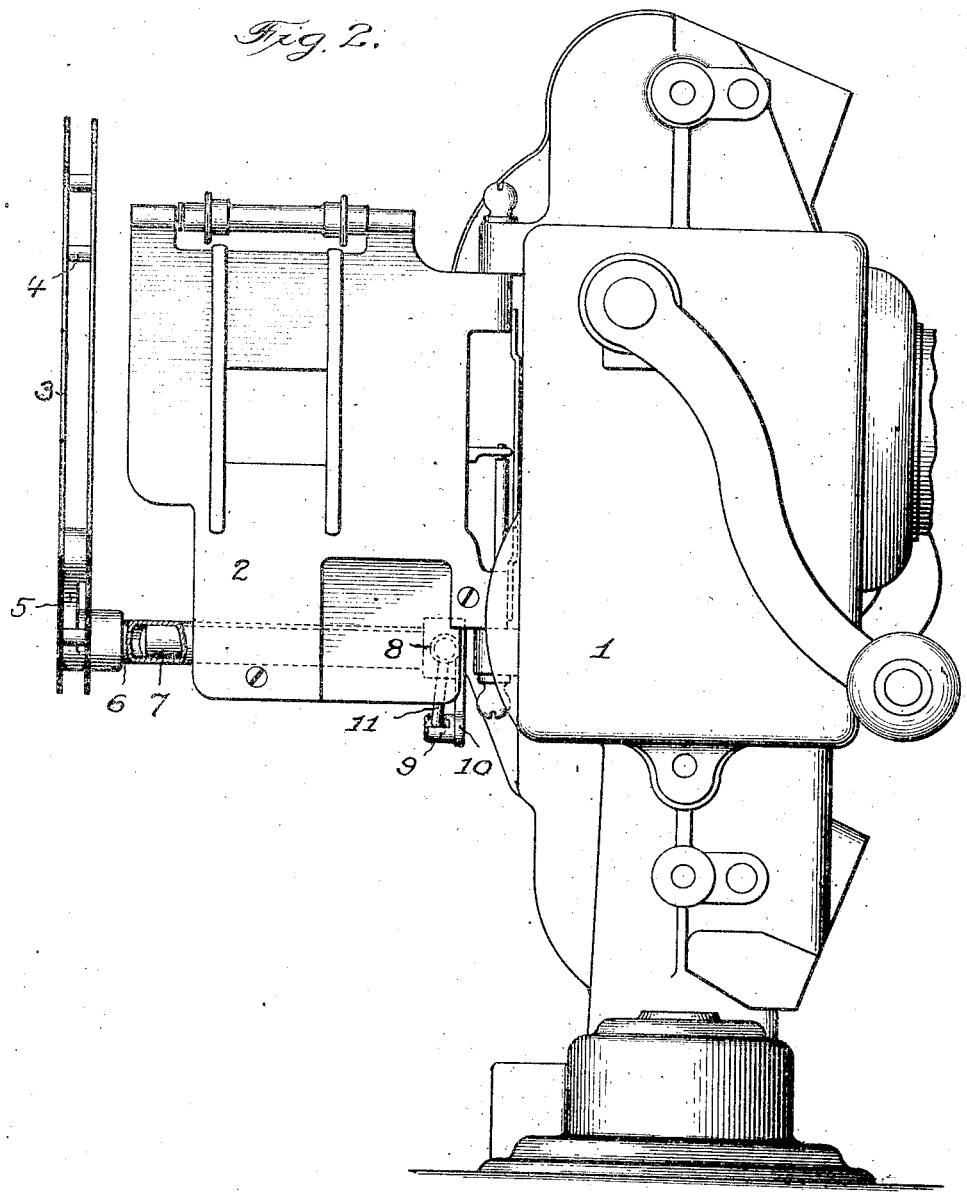

JOHN D. ENGELBREIT, OF CHICAGO, ILLINOIS, ASSIGNOR TO THE ENTERPRISE OPTICAL MFG. COMPANY, OF CHICAGO, ILLINOIS, A CORPORATION OF ILLINOIS.

AUTOMATIC SHUTTER FOR KINETOSCOPES.

1,138,364.  Specification of Letters Patent.  Patented May 4, 1915.

Application filed February 17, 1913. Serial No. 748,826.

*To all whom it may concern:*

Be it known that I, JOHN D. ENGELBREIT, a citizen of the United States of America, and a resident of Chicago, in the county of Cook, State of Illinois, have invented certain new and useful Improvements in Automatic Shutters for Kinetoscopes, of which the following is a specification.

This invention relates to an automatically operating auxiliary fire shutter for protecting the film of a kinetoscope from the heat rays proceeding from the lamp house, when the film is at rest and the film guiding gate is in an opened position. And the present improvement has for its object to provide a simple and efficient structural formation and arrangement of parts in which an oscillatory fire shutter is operatively associated with the hinged film guiding gate of the kinetoscope, so that when said gate is open the fire shutter will be in an active position to intercept the heat rays from the lamp house, and when said film gate is closed, said shutter will automatically assume a dormant position to permit an unobstructed passage of the light rays from the lamp house, all as will hereinafter more fully appear.

In the accompanying drawings: Figure 1, is a rear elevation of a kinetoscope having the present improvement applied, parts being broken away, and a closed position of the film gate being shown in full lines and an open position in dotted lines, with the corresponding dormant position of the fire shutter in full lines and the active position in dotted lines. Fig. 2, is a side elevation, showing said film gate in an open position and the fire shutter in its active heat ray intercepting position.

Similar reference numerals indicate like parts in both views.

Referring to the drawings, 1 represents the frame or housing of a kinetoscope of any usual construction and carrying at its rear end a hinge film guiding gate 2, formed with the usual light passage, and preferably containing the usual safety shutter mechanism, such as described in Letters Patent of A. C. Roebuck, No. 1,006,406, of October 17, 1911.

3 is a shield or shutter preferably circular form shown, and comprising a pair of circular disks secured together in separated relation by spacing means or rivets 4, and adapted to provide an intermediate space between the disks and open on all edges through which air can freely circulate to keep the parts in a comparatively cool condition.

5 is a carrying arm attached at one end to an edge of the shutter 3, and having at its other end a journal sleeve 6, which by engagement with a fixed horizontal shaft 7 on the kinetoscope frame 1 is adapted to afford the required pivotal support for the shutter 3, aforesaid. In the present construction the journal sleeve 6, and horizontal bearing shaft 7, are of such length as to locate the shutter 3 at a point sufficiently to the rear of the film gate 2, so that said gate is free to open without hindrance from said shutter, as illustrated in Fig. 2.

8 is a socket member of the universal type, attached to the film gate 2, near its lower end, and 9, is a companion socket member of the universal type and disposed on the free end of an arm or lever 10, attached to the forward end of the journal sleeve 6, above described.

11, is an intermediate connecting link, the ends of which are preferably of the globe form shown, and adapted for engagement with the respective socket members 8 and 9, to provide the required universal movements of the ends of said link in the practical use of the present mechanism, and due to the different planes in which the film gate and the fire shutter have their movements.

Having thus fully described my said invention what I claim as new and desire to secure by Letters Patent, is:—

1. In a safety shutter mechanism, the combination of a film gate, an oscillatory shutter journaled a distance to the rear of said gate, and operative connections between said gate and shutter for effecting simultaneous movements of the same, substantially as set forth.

2. In a safety shutter mechanism, the combination of a film gate, an oscillatory shutter journaled a distance to the rear of said gate, and operative connections between said gate and shutter for effecting simultaneous movements thereof, the same comprising an intermediate member having universal connections with the aforesaid shutter and gate, substantially as set forth.

3. In a safety shutter mechanism, the combination of a film gate, an oscillatory shutter journaled a distance to the rear of said gate, and operative connections between said gate and shutter for effecting simultaneous movements thereof, the same comprising universal socket members connected to said gate and shutter and an intermediate link having globular ends for engagement in said sockets, substantially as set forth Signed at Chicago, Illinois, this 15th day of February, 1913.

JOHN D. ENGELBREIT.

Witnesses:
 ROBERT BURNS,
 HENRY MOE.